United States Patent [19]
Leiber

[11] 3,933,060
[45] Jan. 20, 1976

[54] AUTOMATIC LATHE

[75] Inventor: Hans-Jürgen Leiber, Tramelan, Switzerland

[73] Assignee: Kummer Freres S.A., Fabrique de machines, Tramelan, Switzerland

[22] Filed: Jan. 27, 1975

[21] Appl. No.: 544,519

[30] Foreign Application Priority Data
Jan. 29, 1974 Switzerland.......................... 1204/74

[52] U.S. Cl. ...................................................... 82/5
[51] Int. Cl.² ......................... B23B 1/00; B23B 3/28
[58] Field of Search ..................................... 82/5, 19

[56] References Cited
UNITED STATES PATENTS

| | | | |
|---|---|---|---|
| 2,576,570 | 11/1951 | Castelli .................................. | 82/5 X |
| 2,578,221 | 12/1951 | Bodmer ................................. | 82/5 X |
| 3,285,108 | 11/1966 | Thevenet ............................... | 82/5 |
| 3,420,126 | 1/1969 | Renoux .................................. | 82/5 |

*Primary Examiner*—Harrison L. Hinson
*Attorney, Agent, or Firm*—Werner W. Kleeman

[57] ABSTRACT

An automatic lathe comprising a workpiece spindle, a compound slide embodying a longitudinal slide and a cross-slide, two primary cam disks seated on a primary control shaft, and transmission levers individually associated with said primary cam disks. The longitudinal slide and said cross-slide each are controlled by said primary cam disks through the agency of the individually associated transmission levers. At least two lathe tool supports are arranged adjacent one another at the compound slide. A control mechanism is provided which can be switched-on during a portion of each work cycle of the automatic lathe for carrying out a thread chasing operation by means of a thread chasing tool clamped in one of the lathe tool supports. The control mechanism embodies an auxiliary control shaft which is or can be placed in driving connection with the workpiece spindle and two auxiliary control cam disks fixedly seated upon said auxiliary control shaft. The auxiliary control shaft is displaceable into an axial position for thread chasing in which the first of such auxiliary control cam disks carries out the control of the movements of the longitudinal slide by means of a plunger associated with said first auxiliary control cam disk and the transmission lever associated with the longitudinal slide and in which the second of the auxiliary control cam disk acts upon the cross-slide by means of a plunger associated with said second auxiliary control cam disk and an additional transmission lever member in order to raise-off the cross-slide from the transmission lever associated therewith for the time duration of each rapid return movement of the longitudinal slide controlled by the first auxiliary control cam disk between successive thread chasing operations in order to lift-off the thread chasing tool from the workpiece.

3 Claims, 2 Drawing Figures

AUTOMATIC LATHE

BACKGROUND OF THE INVENTION

The present invention broadly relates to automatic machine tools and, in particular, concerns a new and improved construction of automatic lathe.

By means of so-called thread chasing or thread cutting operations it is possible to produce at turning machines or lathes of the most different species very accurate threads with high surface. The predominent type of thread chaser mechanisms are assemblies which, for instance, can be attached to a slide or a turret of a lathe or turning machine. The tool --a thread cutting or thread chaser chisel-- is attached to a chaser slide belonging to such assembly and to which there is imparted by means of guide cams repetitive longitudinal and transverse movements.

Particularly in the case of automatic face or front lathes and similar turning machines which possess a compound slide as the tool support the mounting of a thread chaser mechanism --especially the construction of a chaser slide-- is extremely problematic. The chaser slide requires a great deal of space and thus considerably reduces the work space of the machine. Due to the deficiency in space additionally the chaser slides and the associated guides are oftentimes too small and of insufficient robust construction for the high cutting forces which arise during thread chasing.

In the case of automatic face lathes or the like in which the longitudinal and transverse movements of the compound slide and the tools secured thereon are controlled by primary control cams, it would be possible through the use of the latter to simulate a thread chasing operation as part of a work cycle; this has the advantage that there are eliminated the drawbacks associated with a chaser slide. However, there would be only possible very few chaser strokes since for the control thereof it would be necessary to provide a great deal of space at the primary control cams, in other words there would remain only very little space for the control of other turning or lathe operations at the same workpiece during one chucking.

SUMMARY OF THE INVENTION

The invention proceeds from an automatic lathe embodying a workpiece spindle and a compound slide, the longitudinal and transverse slides of which are each controllable by one of two primary cam disks seated upon a primary control shaft and through the agency of transmission levers individually associated with such primary cam disks and wherein at least two lathe tool supports are arranged adjacent one another on the compound slide.

It is a primary object of the present invention to further construct an automatic lathe of such species or type in a manner that while using the compound slide as the support for a thread chaser tool or chisel it is possible to carry out an actual thread chaser operation without resorting to the use of the primary control cams for generating the repetitive longitudinal and transverse movements which are typical for thread chasing.

Now in order to implement this object and others which will become more readily apparent as the description proceeds, the invention contemplates providing a control mechanism which can be switched-on during a part of each work cycle of the automatic lathe in order to carry out a thread chasing operation by means of a thread chaser tool which is clamped in one of the aforementioned lathe tool supports. The control mechanism possesses an auxiliary control shaft which is or can be placed in driving connection with the workpiece spindle. Fixedly seated on the auxiliary control shaft are two auxiliary control cam disks. The auxiliary control shaft is displaceable into an axial position for the thread chasing in which the first of such auxiliary control cam disks assumes the control of the movements of the longitudinal slide by means of a plunger associated with said first auxiliary control cam disk and the transmission lever associated with the longitudinal slide --and which transmission lever is constructed as a three-arm structure for this purpose-- and wherein the second of the auxiliary control cam disks acts upon the cross-slide by means of a plunger associated with said second auxiliary control cam disk and an additional transmission lever, in order to liftoff the cross-slide from the therewith associated transmission lever for the time duration of each rapid return movement of the longitudinal slide between successive thread chaser operations --which rapid return movement is controlled by the first auxiliary control cam disk-- for the purpose of lifting the thread chaser tool off of the workpiece.

Due to such construction there results as a primary advantage that, on the one hand, there is eliminated every special slide or chaser slide and the therewith associated drawbacks, yet on the other hand, because the simple feed movement control at the one primary control cam only requires very little space there remains quite considerable space (i.e. part of a revolution) for the control of other turning operations belonging to the same work cycle. Hence, there are combined all of the advantages which result from the elimination of actual chaser slides with those advantages known for quite some time to those skilled in the art which are inherent to thread chasing as concerns the movement control and renders possible the saving of a great deal of space at the primary control cams.

BRIEF DESCRIPTION OF THE DRAWINGS

The invention will be better understood and objects other than those set forth above, will become apparent when consideration is given to the following detailed description thereof. Such description makes reference to the annexed drawings wherein.

DETAILED DESCRIPTION OF THE PREFERRED EMBODIMENTS

Figures 1, 2:
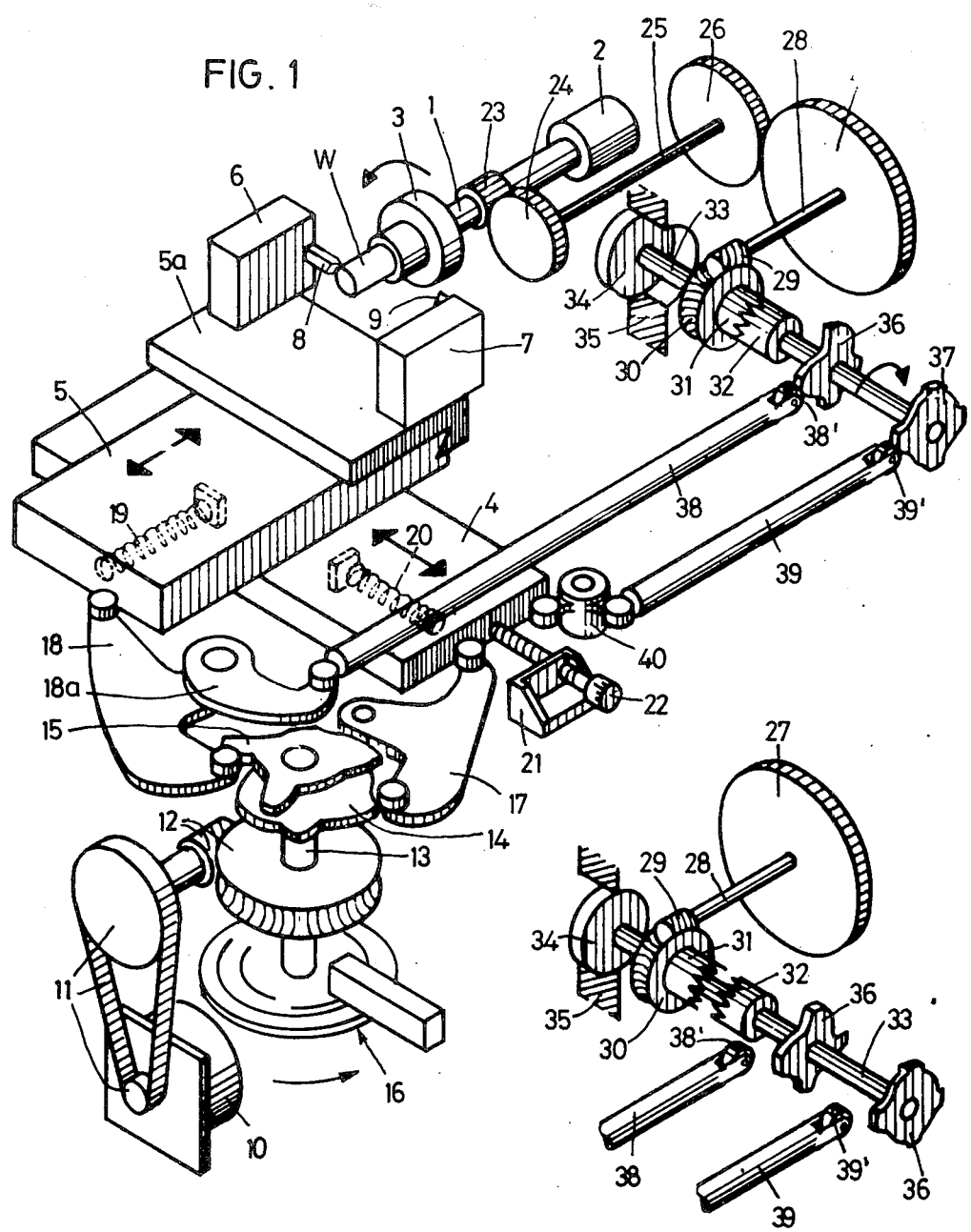
FIG. 1 is a schematic perspective illustration of the invention.
FIG. 2 is a partial illustration similar to the showing of FIG. 1 in which certain parts are portrayed in a different operating position.

Describing now the drawings it is to be understood that as a matter of convenience in illustration only enough of the automatic lathe of this development has been shown in order to enable those skilled in the art to fully comprehend the underlying concepts of this invention. Hence, referring particularly to FIG. 1 it is to be understood that reference character 1 designates a workpiece spindle which is driven by a suitable drive motor 2 and which carries a chuck 3 in which there is clamped a workpiece W. A compound slide embodies a (lower) transverse or cross-slide 4 and a (upper) longitudinal slide 5; belonging to such is a support portion 5a at which there are secured tool supports 6 and 7 adjacent one another. In these tool supports 6 and 7 there are clamped the lathe tools or chisels 8 and 9, wherein the tool 8 is assumed to constitute a thread chaser or thread cutting tool.

There is further provided a primary or main control shaft 13 driven by a suitable drive motor 10 through the agency of a toothed belt drive 11 and a worm drive 12. The main or primary control cam disks 14, 15 and the rotor of a (electric) program device 16 are fixedly seated upon the primary control shaft 13. The program device 16 controls different auxiliary functions, of which several thereof will be further mentioned hereinafter, in conventional manner during the course of a work cycle (i.e. one revolution of the primary control shaft 13). During a major portion of each work cycle of the machine the primary control cam disks 14, 15 control the movements of the transverse or cross-slide 4 by means of a transmission lever 17 and those of the longitudinal slide 5 by means of a transmission lever 18, as such is conventional for an automatic face lathe. In this regard the springs 19, 20 normally serve the purpose of maintaining the frictional connection. It is also quite well known to provide at a stationary machine part 21 impact or stop screws or the like, as indicated by reference character 22, in order to determine the end or terminal positions of the cross-slide.

The motor 10 is operatively connected with the motor 2 for instance by means of a so-called "electrical shaft", and specifically in such a manner that with variable rotational speed of the spindle drive motor 2 it is additionally also possible to change within a certain range the transmission or reduction gear ratio $i$ between the drive motor 2 and the motor 10, in other words between the workpiece spindle 1 and the control shaft 13, wherein for instance $i_{max}/i_{min} = 8$.

In order to render possible a thread chasing operation, for instance with the thread chaser tool 8 during a part of each work cycle, that is to say, during each revolution of the primary control shaft 13 there are provided the following additional measures.

Primarily there is provided an additional control mechanism which renders possible, during slower rotational movement of the primary control shaft 13 related to the spindle 1, imparting to slides 4 and 5 of the compound slide the movements which are typical for thread chasing and which repeat in a rapid sequence; in this regard the main or primary control cam disk 14 together with the associated transmission lever 17 acts as stop means at the cross-slide 4 during the thread chasing strokes of the longitudinal slide 5 and controls the feed movement. In the terminal phase of the thread chasing operation there then still comes into play the stop screw 22 which determines the thread diameter.

With the schematically illustrated exemplary embodiment of the invention the workpiece spindle 1 drives the driving axially fixed portion 31 of a coupling through the agency of the change gears or change gearing drive 23–28 and the worm drive or worm gearing 29, 30. The driven portion or part 32 of such coupling is fixedly seated upon an auxiliary control shaft 33 which can be brought selectively into the position of FIG. 1 or that of FIG. 2 by carrying out an axial displacement by means of for instance a double-acting piston and cylinder unit 34, 35 which is operated for instance with compressed air. In the position shown in FIG. 1 the coupling 31, 32 is engaged and two auxiliary control cam disks 36, 37 fixedly seated upon the auxiliary control shaft 33 are located in their working or effective position with respect to the therewith associated transmission plungers 38 and 39 respectively. In the position shown in FIG. 2 the coupling 31, 32 is disengaged and the auxiliary control cam disks 36, 37 are laterally shifted or offset with respect to the plungers 38, 39 and assume an ineffectual position. The plunger 38 acts upon a third arm 18a of transmission lever 18 and thus upon the longitudinal slide 5. The for instance four raised control portions of the associated auxiliary control cam disk 36 each possess an approximately spirally ascending curve or cam section for carrying out a thread chaser stroke, and it is for this reason that the course of this curve section must be determined such that there results a constant pitch at the threading to be produced while taking into account the transmission kinematics. The four raised control portions of the auxiliary control cam disk 36 furthermore have a respective steep curve or cam section for the rapid return of the slide 5.

Continuing, it will be recognized that the auxiliary control cam disk 37 has raised portions which act through the agency of the plunger 39 and a lever 40 upon the cross-slide 4. Specifically such occurs in the manner that in each case at the end of a thread chaser stroke of the longitudinal slide 5 the cross-slide 4 is raised-off of the transmission lever 17 --for the purpose of retracting the thread chaser tool out of the workpiece-- during the rapid return of the longitudinal slide 5 is held raisedoff and prior to the start of the next following thread chaser stroke in conjunction with the spring 20 is again shifted back until it comes to bear at the transmission lever 17. These operations which are brought about by the auxiliary control cam disks 36, 37 repeat --as such is typical for thread chasing-- with a rhythm or cadence which is dependent upon the rotational speed of the workpiece spindle 1, the reduction ratio of the gearing 23–28 and 29, 30 and the number of raised portions at the auxiliary control cam disks 36, 37. The position of the cross-slide 4, that is, the penetration depth of the thread chaser tool 8 into the workpiece W during the thread chaser strokes of the longitudinal slide 5 --therefore also the advance or feed movement of the cross-slide 4 and thread chaser tool 8 during the entire thread chasing operation-- are controlled by an associated special section of the profile of the primary control cam disk 14 which spirally ascends with a weak pitch. In this regard there is advantageously contemplated that the program or programming device 16 insures that --while acting upon the "electric shaft" between the motors 2 and 10-- the primary control shaft 13 rotates considerably slower during the entire thread chasing operation than during the remainder of the work cycle. Furthermore, there is advantageously provided that at the end of a thread chasing operation and the advance or feed movement of the cross-slide 4 the latter bears against the stop or impact screw 22 for exactly determining the final penetration depth of the thread chaser tool 8 into the workpiece W and the longitudinal slide 5 then still carries out one or two thread chaser strokes.

The displacement of the auxiliary control shaft 33, required for the thread chasing operation, from the position according to the showing of FIG. 2 into the position of FIG. 1, as already mentioned, is brought about by the piston and cylinder unit 34, 35; the control of the compressed or pressurized air for this purpose or the otherwise employed operating medium or means occurs by means of the program device 16; the same also holds true if after completion of a thread chasing operation the auxiliary control shaft 33 is adjusted back into the position according to FIG. 2. In order that during the first mentioned displacement the auxiliary control cam disks 36, 37 do not impact against the plungers 38, 39 and the associated feeler rollers 38', 39' --advantageously also when the displacement occurs from the position of FIG. 1 into that of FIG. 2-- there must be insured that in each instance the plungers 38, 39 are shifted out of the operable or effective range of the auxiliary control cam disks 36, 37. The primary control cam disks 14, 15 thus must possess appropriate raised portions and additionally there must be provided not particularly here illustrated means which insure that the plunger 38 remains in contact with the arm 18a of the lever and that also the lever 40 remains in contact with the cross-slide 4 and the plunger 39 remains in contact with the lever 40. Such means, which have not been shown to preserve clarity in illustration, can consist for instance of springs acting upon the plungers 38, 39.

As far as the described exemplary embodiment of the invention is concerned it is to be specifically understood that many different modifications and changes can be carried out. The coupling 31, 32 could be omitted. In such case the auxiliary control shaft 33 would always be in driving connection with the workpiece spindle 1. Further, the displacement of the auxiliary control shaft 33 could occur electromagnetically instead of pneumatically.

Furthermore, it is conceivable that the thread chasing is completely independent of the primary control cam disks in that, among other things, the advance or feed movement would occur by means of an hydraulic piston and cylinder unit.

While there is shown and described present preferred embodiments of the invention, it is to be distinctly understood that the invention is not limited thereto but may be otherwise variously embodied and practiced within the scope of the following claims.

Accordingly, what is claimed is:

1. An automatic lathe comprising a workpiece spindle, a compound slide arrangement embodying a longitudinal slide and a cross-slide, a primary control shaft, two primary cam disks seated on said primary control shaft, transmission levers individually operatively associated with said primary cam disks, said longitudinal slide and said cross-slide each being controlled by said primary cam disks through the agency of the respective individually associated transmission lever, at least two lathe tool supports arranged adjacent one another at the compound slide, a control mechanism which can be switched-on during a portion of each work cycle of the automatic lathe for carrying out a thread chasing operation by means of a thread chasing tool clamped in one of said lathe tool supports, said control mechanism embodying an auxiliary control shaft for driving connection with the workpiece spindle, two auxiliary control cam disks defining first and second auxiliary control cam disks fixedly seated upon said auxiliary control shaft, a respective plunger operatively associated with each slide and auxiliary control cam disk, means for displacing said auxiliary control shaft into an axial position for thread chasing in which the first of said auxiliary control cam disks carries out the control of the movements of the longitudinal slide by means of the plunger associated with said first auxiliary control cam disk and the transmission lever associated with the longitudinal slide and in which the second of the auxiliary control cam disks acts upon the cross-slide by means of the plunger associated with said second auxiliary control cam disk and an additional transmission lever member in order to raise-off the cross-slide from the transmission lever associated therewith for the time duration of each rapid return movement of the longitudinal slide controlled by the first auxiliary control cam disk between successive thread chasing operations in order to lift-off the thread chasing tool from the workpiece.

2. The automatic lathe as defined in claim 1, wherein the transmission lever associated with the longitudinal slide is constructed as a three-arm transmission lever arrangement.

3. The automatic lathe as defined in claim 1, wherein during the thread chasing operation the primary control cam disk operatively associated with the cross-slide controls, through the agency of the associated transmission lever, the feed movement of the cross-slide and thus the thread chasing tool.

* * * * *